(12) United States Patent
Coatney et al.

(10) Patent No.: US 7,930,587 B1
(45) Date of Patent: Apr. 19, 2011

(54) SYSTEM AND METHOD FOR STORAGE TAKEOVER

(75) Inventors: Susan M. Coatney, Cupertino, CA (US); Kayuri Patel, Cupertino, CA (US); Stephen H. Strange, Mountain View, CA (US); Steven S. Watanabe, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/548,501

(22) Filed: Aug. 27, 2009

Related U.S. Application Data

(63) Continuation of application No. 11/606,727, filed on Nov. 30, 2006, now Pat. No. 7,613,947.

(51) Int. Cl.
 *G06F 11/00* (2006.01)
(52) U.S. Cl. .......................................................... 714/7
(58) Field of Classification Search ...................... 714/7
 See application file for complete search history.

(56) References Cited

U.S. PATENT DOCUMENTS

| | | |
|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,570,217 A | 2/1986 | Allen et al. |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |

(Continued)

FOREIGN PATENT DOCUMENTS

EP  1 324 200 A2  7/2003

(Continued)

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

(Continued)

*Primary Examiner* — Bryce P Bonzo
(74) *Attorney, Agent, or Firm* — Cesari and McKenna, LLP

(57) ABSTRACT

A system and method for performing a takeover procedure is disclosed. A plurality of storage system nodes is coupled in a cluster. One or more of the plurality of storage system nodes in the cluster is notified to takeover at least a portion of a writable storage device serviced by another storage system node in the cluster. In response to the notification, the portion of the writable storage device is assimilated into at least one of the notified storage system nodes.

30 Claims, 11 Drawing Sheets

U.S. PATENT DOCUMENTS

| | | | |
|---|---|---|---|
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,124,987 A | 6/1992 | Milligan et al. | |
| 5,128,810 A | 7/1992 | Halford | |
| 5,148,432 A | 9/1992 | Gordon et al. | |
| RE34,100 E | 10/1992 | Hartness | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,271,012 A | 12/1993 | Blaum et al. | |
| 5,274,799 A | 12/1993 | Brant et al. | |
| 5,278,979 A | 1/1994 | Foster et al. | |
| 5,305,326 A | 4/1994 | Solomon et al. | |
| 5,351,246 A | 9/1994 | Blaum et al. | |
| 5,355,453 A | 10/1994 | Row et al. | |
| 5,375,128 A | 12/1994 | Menon et al. | |
| 5,403,667 A | 4/1995 | Simoens | |
| 5,410,667 A | 4/1995 | Belsan et al. | |
| 5,485,579 A | 1/1996 | Hitz et al. | |
| 5,537,567 A | 7/1996 | Galbraith et al. | |
| 5,579,475 A | 11/1996 | Blaum et al. | |
| 5,581,724 A | 12/1996 | Belsan et al. | |
| 5,623,595 A | 4/1997 | Bailey | |
| 5,657,468 A | 8/1997 | Stallmo et al. | |
| 5,802,366 A | 9/1998 | Row et al. | |
| 5,805,788 A | 9/1998 | Johnson | |
| 5,812,753 A | 9/1998 | Chiariotti | |
| 5,819,292 A | 10/1998 | Hitz et al. | |
| 5,862,158 A | 1/1999 | Baylor et al. | |
| 5,884,098 A | 3/1999 | Mason, Jr. | |
| 5,892,955 A | 4/1999 | Ofer | |
| 5,894,588 A | 4/1999 | Kawashima et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,956,734 A | 9/1999 | Schmuck et al. | |
| 5,963,962 A | 10/1999 | Hitz et al. | |
| 5,975,738 A | 11/1999 | DeKoning et al. | |
| 6,038,570 A | 3/2000 | Hitz et al. | |
| 6,061,770 A | 5/2000 | Franklin | |
| 6,065,037 A | 5/2000 | Hitz et al. | |
| 6,081,875 A | 6/2000 | Clifton et al. | |
| 6,092,215 A | 7/2000 | Hodges et al. | |
| 6,119,244 A | 9/2000 | Schoenthal et al. | |
| 6,128,734 A | 10/2000 | Gross et al. | |
| 6,138,125 A | 10/2000 | DeMoss | |
| 6,138,126 A | 10/2000 | Hitz et al. | |
| 6,138,201 A | 10/2000 | Rebalski | |
| 6,158,017 A | 12/2000 | Han et al. | |
| 6,192,483 B1 * | 2/2001 | Moiin et al. | 714/4 |
| 6,205,481 B1 | 3/2001 | Heddaya et al. | |
| 6,223,300 B1 | 4/2001 | Gotoh | |
| 6,247,157 B1 | 6/2001 | Edirisooriya | |
| 6,289,356 B1 | 9/2001 | Hitz et al. | |
| 6,292,905 B1 | 9/2001 | Wallach et al. | |
| 6,341,341 B1 | 1/2002 | Grummon et al. | |
| 6,343,324 B1 * | 1/2002 | Hubis et al. | 709/229 |
| 6,347,248 B1 | 2/2002 | Gliner | |
| 6,425,035 B2 | 7/2002 | Hoese et al. | |
| 6,446,751 B1 | 9/2002 | Ahuja | |
| 6,449,622 B1 | 9/2002 | LaRue et al. | |
| 6,449,641 B1 * | 9/2002 | Moiin et al. | 709/220 |
| 6,532,548 B1 | 3/2003 | Hughes | |
| 6,557,123 B1 | 4/2003 | Wiencko et al. | |
| 6,571,326 B2 | 5/2003 | Spiegel et al. | |
| 6,581,185 B1 | 6/2003 | Hughes | |
| 6,625,747 B1 | 9/2003 | Tawil et al. | |
| 6,654,902 B1 | 11/2003 | Brunelle et al. | |
| 6,658,540 B1 * | 12/2003 | Sicola et al. | 711/162 |
| 6,671,772 B1 | 12/2003 | Cousins | |
| 6,671,773 B2 | 12/2003 | Kazar et al. | |
| 6,708,265 B1 | 3/2004 | Black | |
| 6,725,392 B1 * | 4/2004 | Frey et al. | 714/6 |
| 6,728,897 B1 | 4/2004 | Cramer et al. | |
| 6,742,137 B1 | 5/2004 | Frey, Jr. | |
| 6,757,695 B1 | 6/2004 | Noveck et al. | |
| 6,779,095 B2 | 8/2004 | Selkirk et al. | |
| 6,920,579 B1 | 7/2005 | Cramer | |
| 6,920,580 B1 | 7/2005 | Cramer et al. | |
| 6,965,936 B1 * | 11/2005 | Wipfel et al. | 709/224 |
| 6,993,701 B2 | 1/2006 | Corbett et al. | |
| 7,073,115 B2 | 7/2006 | English et al. | |
| 7,085,883 B1 * | 8/2006 | Dalgic et al. | 711/114 |
| 7,127,577 B2 | 10/2006 | Koning et al. | |
| 7,149,859 B2 * | 12/2006 | Fujibayashi | 711/162 |
| 7,168,088 B1 * | 1/2007 | Matena | 726/3 |
| 7,203,892 B2 | 4/2007 | Corbett et al. | |
| 7,231,489 B1 | 6/2007 | Larson et al. | |
| 7,260,678 B1 | 8/2007 | Agarwal et al. | |
| 7,260,737 B1 | 8/2007 | Lent et al. | |
| 7,272,613 B2 | 9/2007 | Sim et al. | |
| 7,296,068 B1 | 11/2007 | Sarma et al. | |
| 7,328,305 B2 | 2/2008 | Kleiman et al. | |
| 7,376,679 B2 | 5/2008 | Pasupathy | |
| 7,409,625 B2 | 8/2008 | Corbett et al. | |
| 7,546,302 B1 | 6/2009 | Coatney et al. | |
| 7,613,947 B1 | 11/2009 | Coatney et al. | |
| 7,676,687 B2 * | 3/2010 | Gunda et al. | 714/4 |
| 7,711,683 B1 | 5/2010 | Watanabe et al. | |
| 7,739,541 B1 * | 6/2010 | Rao et al. | 714/4 |
| 2002/0078312 A1 * | 6/2002 | Wang-Knop et al. | 711/150 |
| 2002/0083037 A1 | 6/2002 | Lewis et al. | |
| 2002/0099914 A1 | 7/2002 | Matsunami et al. | |
| 2002/0116593 A1 | 8/2002 | Kazar et al. | |
| 2002/0124137 A1 | 9/2002 | Ulrich et al. | |
| 2002/0174207 A1 | 11/2002 | Battou | |
| 2002/0188590 A1 * | 12/2002 | Curran et al. | 707/1 |
| 2002/0188711 A1 | 12/2002 | Meyer | |
| 2003/0061491 A1 | 3/2003 | Jaskiewicz et al. | |
| 2003/0097611 A1 | 5/2003 | Delaney et al. | |
| 2003/0120743 A1 | 6/2003 | Coatney et al. | |
| 2003/0126139 A1 | 7/2003 | Lee et al. | |
| 2003/0182593 A1 * | 9/2003 | Emberty et al. | 714/6 |
| 2003/0188229 A1 * | 10/2003 | Lubbers et al. | 714/47 |
| 2004/0030668 A1 | 2/2004 | Pawlowski et al. | |
| 2004/0044865 A1 * | 3/2004 | Sicola et al. | 711/162 |
| 2004/0088297 A1 * | 5/2004 | Coates et al. | 707/10 |
| 2005/0193226 A1 | 9/2005 | Ahmed et al. | |
| 2005/0268154 A1 * | 12/2005 | Wipfel et al. | 714/4 |
| 2005/0283641 A1 * | 12/2005 | Clark et al. | 714/4 |
| 2006/0056421 A1 | 3/2006 | Zaki | |
| 2006/0218210 A1 | 9/2006 | Sarma et al. | |
| 2007/0022138 A1 * | 1/2007 | Erasani et al. | 707/104.1 |
| 2007/0118706 A1 * | 5/2007 | Pepper | 711/163 |
| 2007/0124341 A1 * | 5/2007 | Lango et al. | 707/202 |
| 2007/0124453 A1 | 5/2007 | Slaughter et al. | |
| 2007/0168693 A1 * | 7/2007 | Pittman | 714/4 |
| 2007/0244908 A1 * | 10/2007 | Rajan | 707/10 |
| 2007/0276878 A1 * | 11/2007 | Zheng et al. | 707/202 |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File System, ACM Trans. Computer System, 6(1), Feb. 1988 pp. 51-81.

Kazar, Michael Leon, Synchronization and Caching Issues in the Andrew File System, Carnegie Mellon University, CMU-ITC-88-063.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14( 2): 155-168 , Feb. 1988.

Kistler, et al., Disconnected Operation in the Coda File System, ACM Transactions on Computer Systems, vol. 10, No. 1, Feb. 1992, pp. 3-25.

Lorie, Raymond, A. Physical Integrity in a Large Segmented Database, ACM Trans. Database Syst., vol. 2, Mar. 1977, pp. 91-104.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in Computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File Systems: Prototype and Experience, Carnegie-Mellon University, Technical Report CMS-ITC-040, Mar. 1985.

Zayas, Edward R., AFS-3 Programmer's Reference: Architectural Overview, Transarc Corporation, Pittsburgh, PA, 1.0 edition 1991.

Anvin, Peter H, "*The Mathematics of RAID 6*," Dec. 2004.

Auspex 4Front NS2000, System Architecture, Network-Attached Storage For a New Lillennium, Auspex Enginnering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Blaum, Mario, et al., *Evenodd: An Optimal Scheme for Tolerating Double Disk Failures in RAID Architectures*, Computer Architectures News, Association for Computing Machinery, New York, US, vol. 22, No. XP000450355, Apr. 1, 1994.

Blaum, Mario, et al., *Evenodd: An Efficient Scheme for Tolerating Double Disk Failures in RAID Archictures*, IEEE Transactions on Computers, vol. 44, No. 2, Feb. 1995, pp. 192-202.

Bultman, David L., *High Performance SCSI Using Parellel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990— check to see if exact same copy as one in WAFL.

Chen, Peter M.., et al, *Maximizing Performance in a Stiped Disk Array*, Proc. 1990 ACM SIGARCH 17th Intern. Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., *A Comparison of High-Availability Media Recovery techniques*, in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS; An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Austrlia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.
Hellerstein, Lisa, et al,. Coding Techniques for Handling Failures in Large Disk Arrays. In Algorithmica vol. 2, Nr. 3, 182-208 (1994).
Hitz, David, TR3002 File System Design for a NFS File Server Appliance, Network Appliance, Inc.
Hughes, James, et al., High Performance RAIT, Tenth NASA Goddard Conference on Mass Storage Systems and Technologies and Nineteenth IEEE Symposium on Mass Storage Systems, Adelphi, Maryland, USA, Apr. 2002.
Johnson, Theodore, et al, Tape Group Parity Protection, IEEE Symposium on Mass Storage, pp. 72-79, Mar. 1999.
Katz, Randy H. et al., Disk System Architectures for High Performance Computing, undated.
Kim, Michelle Y., Synchronized Disk Interleaving, IEEE Transactions on Computers, C-35(11):978-988, Nov. 1986.
Kim, Michelle, et al., Asynchronous Disk Interleaving Approximating Access Delays, IEEE Transactions on Computers, vol. 40, No. 7, Jul. 1991, pp. 801-810.
Lawlor, F. D., Efficient Mass Storage Parity Recovery Mechanism, IBM Technical Disclosure Bulletin 24(2):986-987, Jul. 1981.
Lee, Edward K., et al., RAID-II: A Scalable Storage Architecture for High-Bandwidth Network File Service, Technical Report UCB/CSD 92/672, (Feb. 1992).
Lee, Edward K., et al., The Performance of Parity Placements in Disk Arrays, IEEE Transactions on Computers, vol. 42 No. 6, Jun. 1993, 14 pages.
Li, Don, et al., Authors' Reply, IEEE Transactions on Communications, 46:575, May 1998.
Limited Distributed DASD Checksum, A RADI Hybrid, IBW Technical Disclosure Bulletin, IBM Corp. New York, US vol. 35. No. 4A, XP000314813, Sep. 1, 1992.
Livny, Miron, et al., Multi-Disk Management Algorithms, In Proceedings of the ACM International Conference on Measurement and Modeling of Computer Systems (SIGMETRICS), pp. 69-77, Banff, Alberta, Canada, May 1987.
Meador, Wes E., *Disk Array Systems*, Proceedings of COMPCON, 1989, pp. 143-146.
Menon, Jai, et al., *Methods for Improved Update Performance of Disk Arrays*, IBM Almaden Research Center, IEEE, Jan. 1992, 10 pages.
Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.
Microsoft Computer Dictionary, 5th Edition, 2002, p. 211.
Ng, Spencer, et al., *Trade-Offs Between Devices and Paths in Achieving Disk Interleaving*, IEEE International Symposium on Computer Architecture, 1988, pp. 196-201.
Ng, Spencer, *Some Design Issues of Disk Arrays*, Proceedings of COMPCON Spring '89, pp. 137-142. IEEE, 1989.
Park, Arvin, et al., *Providing Fault Tolerance in Parallel Secondary Storage Systems*, Technical Report CS-TR-057-86, Princeton, Nov. 1986.
Patel, Arvind M., *Adaptive Cross-Parity (AXP) Code for a High-Density Magnetic Tape Subsystem*, IBM Technical Disclosure Bulletin 29(6):546-562, Nov. 1985.
Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.
Storagesuite, *Performance Without Compromise: The Virtual Storage Architecture*, catalogue, 1997.
Reddy, A. L. Narasimha, et al., *An Evaluation of Multiple-Disk I/O Systems*, IEEE Transactions on Computers, vol. 38, No. 12, Dec. 1989, pp. 1680-1690.
Scheuermann, Peter, et al., *Data Partitioning and Load Balancing in Parallel Disk Systems*, The VLDB Journal, vol. 7, Springer-Verlag, Copyright Feb. 1998, 19 pages.
Schulze, Martin E., Considerations in the Design of a RAID Prototype, Computer Science Division, Department of Electrical Engineering and Computer Sciences, Univ. of CA, Berkley, Aug. 25, 1988.
Schulze, Martin., et al., How Reliable is a RAID?, Proceedings of COMPCON, 1989, pp. 118-123.
Shirriff, Kenneth W., Sawmill:A Logging File System for a High-Performance RAID Disk Array, CSD-95-862, Jan. 1995.
Stanek, William R., Microsoft Windows 2000 Server: Administering Volume Sets and RAID Arrays, Jan. 10, 2006, (http://www.microsoft.com/technet/prodtechnol/windows2000serv/maintain/operate/11w2kada.mspx), (Printed 1999).
Stodolsky, Daniel, et al., Parity Logging Overcoming the Small Write Problem in Redundant Disk Array, School of Computer Science and Department of Electrical and Computer Engineering, Carnegie Mellon University, IEEE, May 1993, 12 pages.
Stonebraker, Michael, et al., The Design of XPRS, Proceedings of the 14th VLDB Conference, LA, CA (1988).
Tanabe, Takaya, et al, Redundant Optical Storage System Using DVD-RAM Library, IEEE Symposium on Mass Storage, pp. 80-87, Mar. 1999.
TEKRAM—"About RAID 6".
Tweten, David, Hiding Mass Storage Under UNIX: NASA's MSS-H Architecture, IEEE Symposium on Mass Storage, pp. 140-145, May 1990.
Weikum, Gerhard, et al., Dynamic File Allocation in Disk Arrays, ETH Zurich, Department of Computer Science Information Systems—Databases, ACM SIGMOD Record, vol. 20, Issue 2, Jun. 1991, 10 pages.
Wilkes, John, et al., The HP AutoRAID hierarchical storage system, ACM Transactions on Computer Systems, Feb. 1996, vol. 14, pp. 108-136.
American National Standards Institute, Inc.; American National Standard for Information Technology; Fibre Channel—Physical and Signaling Interface (FC-PH); Nov. 14, 1994.
American National Standards Institute, Inc.; American National Standard for Information Technology—Fibre Channel Arbitrated Loop (FC-AL-2); Dec. 8, 1999.
SNIA Storage Networking Industry Association; Common Internet FIle System (CIFS), Version: CIFS-Spec. 0.9. Work Group in Progress.
Fibre Channel Generic Services—3 (FC-GS-3), Revision 6.0; NCITS Working Draft Proposed American National Standard for Information Technology; Nov. 24, 1999.
Draft Proposed American National Standard for Information Systems—SCSI-3 Primary Commands; Mar. 28, 1997.
New Identifier Formats Based on IEEE Registration; http://standards.ieee.org/regauth/oui/tutorials/fibreformat.html; Accessed on Aug. 6, 2001.
Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.
Hu Yoshida: "LUN Security Considerations for Storage Area Networks" Hitachi Data Systems, 1999, pp. 1-7, XP002185193.
White, Brian et al., "An Integrated Experimental Environment for Distributed Systems and Networks". Dec. 23, 2002, School of Computing, University of Utah, http://www.cs.utah.ed/flux/netbed, pp. 1-16.
Bolen et al., Application for Single Nodename Cluster System For Fibre Channel, U.S. Appl. No. 11/411,502, filed Apr. 26, 2006, 54 pages.
Watanabe et al., Application for Method and System for Maintaining Disk Location Via Homeness, U.S. Appl. No. 11/606,538, filed Nov. 30, 2006, 46 pages.
Gole, Abhijeet, "Efficient Use of NVRAM During Takeover in a Node Cluster", U.S. Appl. No. 10/011,844, filed Dec. 4, 2001, 34 pages.

\* cited by examiner

500 ⇘

| CF PROTOCOL | 510 |
| RC | 508 |
| UDP | 506 |
| IP | 504 |
| MEDIA ACCESS | 502 |

| SVS ID 602 | INODE NUMBER 604 | UNIQUE-IFIER 606 | STRIPED FLAG 608 | STRIPING EPOCH NUMBER 610 |

| VOLUME ID | 1005 |
|---|---|
| AGGREGATE ID | 1010 |
| ⋮ | 1015 |

| AGGREGATE ID | 1105 |
|---|---|
| D-MODULE ID | 1110 |
| ⋮ | 1115 |

FIG. 11

SYSTEM AND METHOD FOR STORAGE TAKEOVER

CROSS REFERENCE TO RELATED APPLICATIONS

This application is a continuation of U.S. patent application Ser. No. 11/606,727 entitled SYSTEM AND METHOD FOR STORAGE TAKEOVER, by Susan M. Coatney et al., filed Nov. 30, 2006, now issued as U.S. Pat. No. 7,613,947 on Nov. 3, 2009.

This application is related to the following United States Patent Applications:

U.S. patent application Ser. No. 11/606,452 entitled SYSTEM AND METHOD FOR IMPROVED RESOURCE GIVE BACK, by Susan M. Coatney et al., now issued as U.S. Pat. No. 7,546,302 on Jun. 9, 2009, which is presently incorporated by reference in its entirety; and U.S. patent application Ser. No. 11/606,538 entitled SYSTEM AND METHOD FOR MAINTAINING DISK LOCATION VIA HOMENESS, by Steven S. Watanabe et al., now issued as U.S. Pat. No. 7,711,683 on May 4, 2010, which is presently incorporated by reference herein in its entirety.

BACKGROUND OF THE INVENTION

1. Field of the Invention

The present invention relates to networked storage systems and, more particularly, to takeover procedures in clustered storage systems.

2. Background Information

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) is on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages access to information in terms of block addressing on disks using, e.g., a logical unit number (LUN) in accordance with one or more block-based protocols, such as FCP.

One example of a SAN arrangement, including a multi-protocol storage appliance suitable for use in the SAN, is described in United States Patent Application Publication No. US2004/0030668 A1, filed on Feb. 14, 2004, entitled MULTI-PROTOCOL STORAGE APPLIANCE THAT PROVIDES INTEGRATED SUPPORT FOR FILE AND BLOCK ACCESS PROTOCOLS by Brian Pawlowski et al., which is incorporated herein by reference in its entirety.

It is advantageous for the services and data provided by a storage system, such as a storage node, to be available for access to the greatest degree possible. Accordingly, some storage systems provide a plurality of storage system nodes organized as a cluster, with a first storage system node being clustered with a second storage system node. Each storage system node is configured to take over serving data access requests for the other storage system node if the other storage system node fails. The storage nodes in the cluster notify one another of continued operation using a heartbeat signal which is passed back and forth over a cluster interconnect, and over a cluster switching fabric. If one of the storage system nodes detects the absence of a heartbeat from the other storage node over both the cluster interconnect and the cluster switching fabric, a failure is detected and a takeover procedure is initiated. It is noted that the failure is also usually confirmed by the surviving storage node by checking a master mailbox disk of the other storage node to confirm that it is in fact a failure of the other storage node itself and not simply a failure of the cluster interconnect coupling.

More specifically, a mailbox mechanism includes a set of procedures for determining the most up-to-date coordinating information through the use of one or more mailbox disks. Such disks receive messages from the node with which they are associated in order to confirm that the node continues to be in communication with the mailbox disk, which indicates that the node continues to be capable of writing to the disks assigned to that node. Further details on the configuration and operation of the master mailbox disk are provided in commonly-owned U.S. Pat. No. 7,231,489, of Larson et al., for a SYSTEM AND METHOD FOR COORDINATING CLUS- TER STATE INFORMATION, issued on Jun. 12, 2007, which is presently incorporated by reference herein in its entirety.

Many cluster configurations include the concept of partnering. Specifically, each is storage system node in the cluster is partnered with a second storage system node in such a manner that the partner storage system node is available to take over and provide the services and the data otherwise provided by the second storage system node. The partner assumes the tasks of processing and handling any data access requests normally processed by the second storage system node. One such example of a partnered storage system cluster configuration is described in U.S. Pat. No. 7,260,737, entitled SYSTEM AND METHOD FOR TRANSPORT-LEVEL FAILOVER OF FCP DEVICES IN A CLUSTER, by Arthur F. Lent, et al., the contents of which are hereby incorporated by reference. It is further noted that in such storage system node clusters, an administrator may desire to take one of the storage system nodes offline for a variety of reasons including, for example, to upgrade hardware, etc. In such situations, it may be advantageous to perform a "voluntary" user-initiated takeover operation, as opposed to a failover operation. After the takeover operation is complete, the storage system node's data is serviced by its partner until a giveback operation is performed.

Another example of a storage system node cluster configuration takeover technique is described in U.S. patent application Ser. No. 11/411,502, entitled SINGLE NODE NAME CLUSTER SYSTEM FOR FIBER CHANNEL, by Britt Bolen et al., the contents of which are hereby incorporated by reference. In this configuration, the cluster has a single world wide node name so that the cluster as a whole appears to the client as a single device. In such clusters, two storage system nodes are partnered such that a first storage system node serves its own "locally owned" data from the disks to which it is directly connected, and proxies requests for its partner disks to a partner storage system node. During takeover operations, the locally owned data of the failed storage system node is serviced by its partner until a give back operation is performed.

In such cases employing a partner mode, additional infrastructure is often required. For example, requests are tracked to determine whether they are partner requests. Data structures are also duplicated. Separate tables describing the data, such as for example, a volume location database (VLDB) must be maintained for the local disks and is for the partner disks. In addition, registry files which store options and configuration parameters are also maintained separately in a local registry file and a partner registry file. As will be apparent to those skilled in the art, this results in additional code complexity in many systems.

It is also noted that, in some storage system architectures, the nodes in each cluster are generally organized as a network element (N-module) and a disk element (D-module). The N-module includes functionality that enables the node to connect to clients over a computer network, while each D-module connects to one or more storage devices such as the disks of a disk array. A file system architecture of the type is generally described in U.S. Pat. No. 6,671,773, issued on Dec. 30, 2003 entitled METHOD AND SYSTEM FOR RESPONDING TO FILE SYSTEM REQUESTS, by M. Kazar et al. (the contents of which are incorporated herein by reference in entirety).

In some recent architectures however, additional functionality has been moved to the N-module which may have previously been performed by the D-module. For example, the N-module handles aspects such as network connectivity. In such configurations, it may be desirable to deliver to upper layers of the N-module a single view of all aggregates that a particular D-module is serving, rather than exposing two sets of aggregates to the N-module (i.e., a local image of the disks being served by the surviving D-module, and a set of partner disks). In previous designs, in a failover, the surviving N-module and D-module took over network addresses and performed other administrative tasks which consumed operational bandwidth in the storage architecture system.

There remains a need, therefore, for a system which eliminates partner mode failover, but allows for a takeover that results in one or more newly assimilated aggregates to be available for access by the N-modules in a multiple node cluster.

SUMMARY OF THE INVENTION

The disadvantages of prior techniques are overcome by the present invention which provides a technique for takeover of a failed node's disks and that produces one or more newly assimilated aggregates to be available for access by the N-modules in a multiple node cluster. When a takeover procedure is triggered, either through a lack of heartbeat, or a command for a takeover is received, the system of the present invention is configured such that one or more surviving nodes of the cluster asserts ownership of disks previously served by a failed node, so that all of the disks are locally owned by one of the surviving nodes in the cluster. So, as a result, one or more new aggregates are established that include all of the failed node's disks. According to the invention, one or more newly assimilated aggregates, now served by one or more surviving D-modules, is then exposed to any N-module that interfaces with the surviving nodes. For clarity of illustration, the invention is described with reference to a single newly assimilated aggregate. It should be understood, however, that one or more newly assimilated aggregates can be served by one or more surviving D-modules, while remaining within the scope of the present invention.

In the illustrative embodiment, when the takeover procedure is invoked, a surviving node changes two elements of ownership with respect to each disk or portion thereof. Specifically, the surviving node first changes one or more ownership attributes (such as SCSI-3 reservations or export rules, as described further herein) to reflect its access rights to the failed node's disks, and secondly, it changes a "current owner" status in an ownership location on the disk to reflect itself (the surviving node) as the current owner of the disk assigned to that surviving node. The newly acquired disks are then properly assimilated into one or more aggregates by a suitable process such as a RAID system of the surviving node. A section of the non-volatile memory (NVRAM), which contains the most recent data about the RAID system, referred to herein as the RAID section of the NVRAM is replayed to flush any final parity computations with respect to the disks forming the new aggregate(s).

Duplications in fsid numbers are corrected so that each volume in the newly assimilated aggregate has its own unique fsid identifier. A file system section of the NVRAM of the node is replayed to bring all data up to date, and the volumes are then brought online to thereby enable the surviving node to serve data access requests as if it locally owns all of the volumes that it claimed from the failed node, which volumes are is now contained in the newly assimilated aggregate. Notably, the system and method described herein are performed without requiring a partner mode in the takeover procedure.

BRIEF DESCRIPTION OF THE DRAWINGS

The above and further advantages of the invention may be better understood by reference to the following description in conjunction with the accompanying drawings in which like reference numerals indicate identical or functionally similar elements:

FIG. 5 is a schematic block diagram illustrating the format of a cluster fabric (CF) message in accordance with an illustrative embodiment of the present invention;

FIG. 6 is a schematic block diagram illustrating the format of a data container handle in accordance with an illustrative embodiment of the present invention;

FIG. 10 is a schematic block diagram of a volume location database (VLDB) volume entry in accordance with an illustrative embodiment of the present invention;

FIG. 11 is a schematic block diagram of a VLDB aggregate entry in accordance with an illustrative embodiment of the present invention.

DETAILED DESCRIPTION OF AN ILLUSTRATIVE EMBODIMENT

A. Cluster Environment

Figure 1:
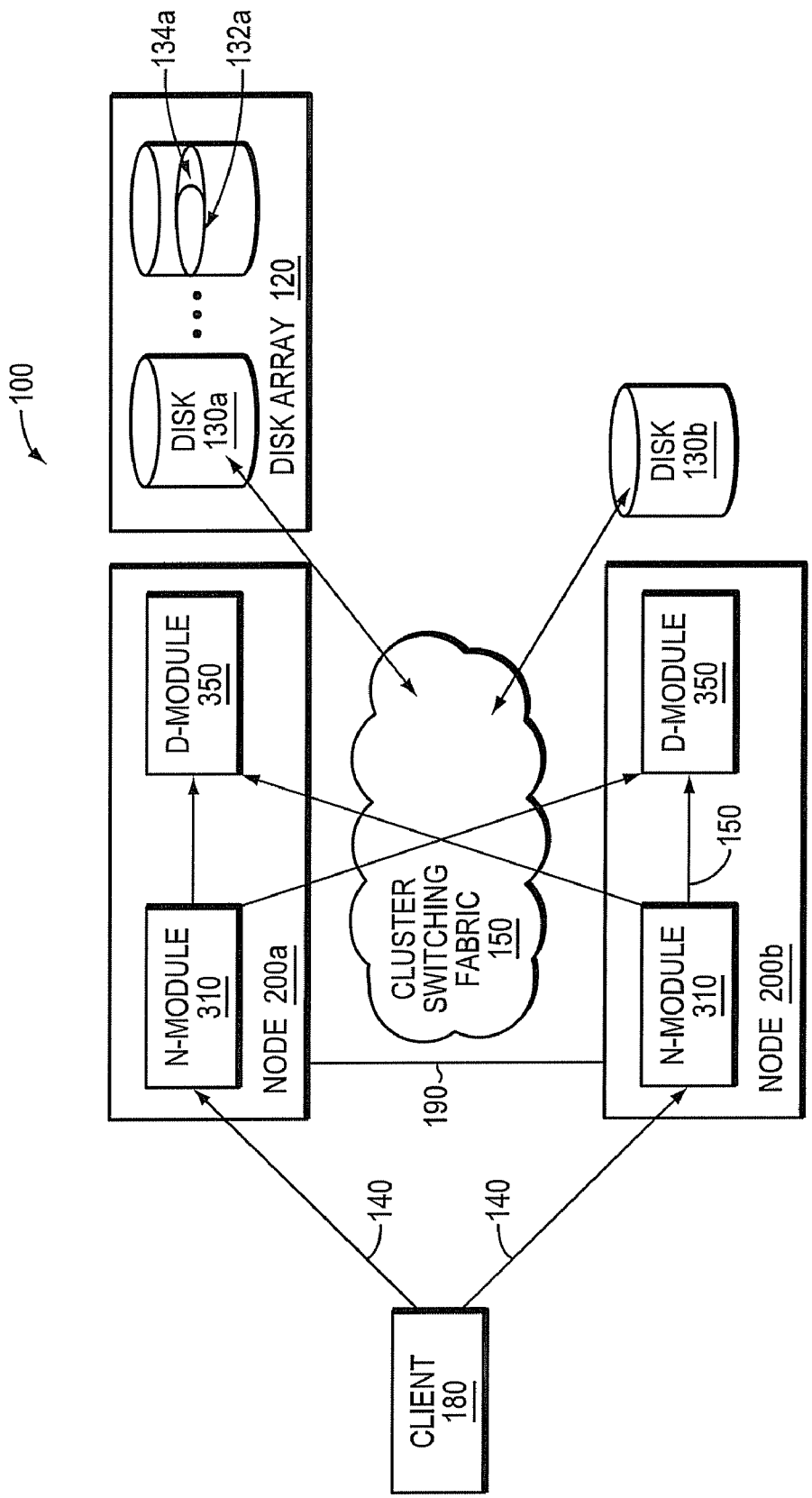
FIG. 1 is a schematic block diagram of a plurality of nodes interconnected as a cluster in accordance with an embodiment of the present invention.

FIG. 1 is a schematic block diagram of a plurality of nodes 200 *a,b* interconnected as a cluster 100 and configured to provide storage services relating to the organization of information on storage devices. The nodes 200 *a,b* comprise various functional components that cooperate to provide a distributed storage system architecture of the cluster 100. To that end, each node 200 *a,b* is generally organized as a network element (N-module 310) and a disk element (D-module 350). The N-module 310 includes functionality that enables the node 200*a*, for example, to connect to clients 180 over a computer network 140, while each D-module 350 connects to one or more storage devices, such as disks 130*a*. The nodes 200 *a,b* are interconnected by a cluster switching fabric 150 which, in the illustrative embodiment, may be embodied as a Gigabit Ethernet switch. An exemplary distributed file system architecture is generally described in U.S. Pat. No. 6,671,773, issued on Dec. 30, 2003 entitled METHOD AND SYSTEM FOR RESPONDING TO FILE SYSTEM REQUESTS, by M. Kazar et al., issued Dec. 30, 2003, which is incorporated by reference herein in its entirety. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 *a,b* comprising one N-module and one D-module should be taken as illustrative is only.

The nodes 200 *a,b* are also coupled across a cluster interconnect 190 which provides an additional communication path between the nodes. The cluster interconnect 190 may be Fibre Channel (FC), InfiniBand or another suitable medium. The cluster interconnect 190 may be used to provide heartbeat signals ("heartbeats") between the two nodes, which signals are used monitor the active state of each node. The cluster heartbeats are also sent across the cluster switching fabric 150 over which communications between an N-module and D-module are illustratively effected through remote message passing over the cluster switching fabric 150, which is sometimes also referred to as the "storage layer." The "death" of a node is indicated by the loss of heartbeat from both the cluster interconnect and the storage layer. The cluster interconnect is sometimes also referred to as the storage takeover interconnect. That is, as described further hereinafter, if the heartbeat terminates (i.e., "times out"), then a takeover procedure is enabled.

The clients 180 may be general-purpose computers configured to interact with the nodes 200 *a,b* in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

During normal cluster operation, the storage system node (e.g., node 200*a*) that is connected to a set of disks 130*a* is identified as the "home" of the disks 130*a*. That storage system node is also identified as the "current owner" at initialization and is primarily responsible for servicing data requests directed to blocks on volumes contained on its set of disks. For example, the storage system node 200*a* is primarily responsible for the volumes of the disk array which are represented as disk 130*a*. Similarly, the storage system node 200*b* is primarily responsible for the disks in the volumes represented as disk 130*b* in FIG. 1. The clustered storage system 100 is configured such that either storage system node 200*a* or 200*b* can take over data servicing capabilities for the other storage system node in the event of a failure in the manner described further herein. Notably, in a multiple node cluster, a failed node's disks may not all be claimed by a single takeover node. Instead, some of the disks may be claimed by a first takeover node, with the remaining disks being claimed by a second takeover node, for example. This may be used for load balancing of I/O traffic.

B. Storage System Node

Figure 2:
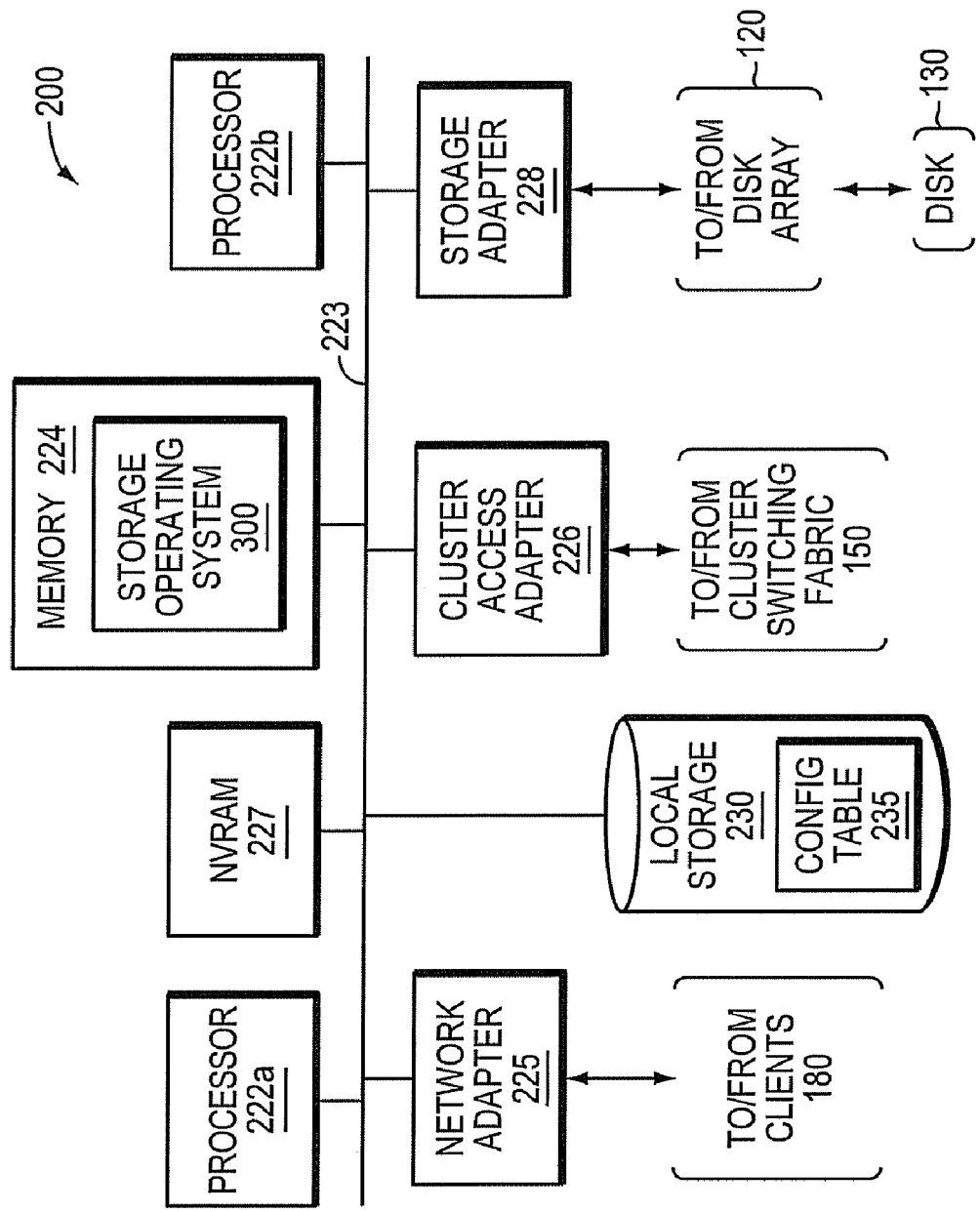
FIG. 2 is a schematic block diagram of a node in accordance with an embodiment of the present invention.

FIG. 2 is a schematic block diagram of a node 200 that is illustratively embodied as a storage system comprising a plurality of processors 222 a,b, a memory 224, a network adapter 225, a cluster access adapter 226, NVRAM 227 (non-volatile random access memory), a storage adapter 228 and local storage 230 interconnected by a system bus 223. The local storage 230 comprises one or more storage devices, such as disks, which can be utilized by the node to locally store configuration information (e.g., in configuration table 235) provided by one or more management processes that execute as user mode applications 900 (see FIG. 9). Alternatively, such information may be stored remotely. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 (FIG. 1) may be embodied as an Ethernet network or a FC network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of the disk array 120. The storage adapter comprises a plurality of ports having input/output (I/O) interface circuitry that couples to the disks over an I/O interconnect arrangement, such as a conventional high-performance, FC link topology.

Storage of information on each disk array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data, once all of the disks in a given RAID group are assimilated. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers such as blocks on the disks that are exported as named logical unit numbers (LUNs).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
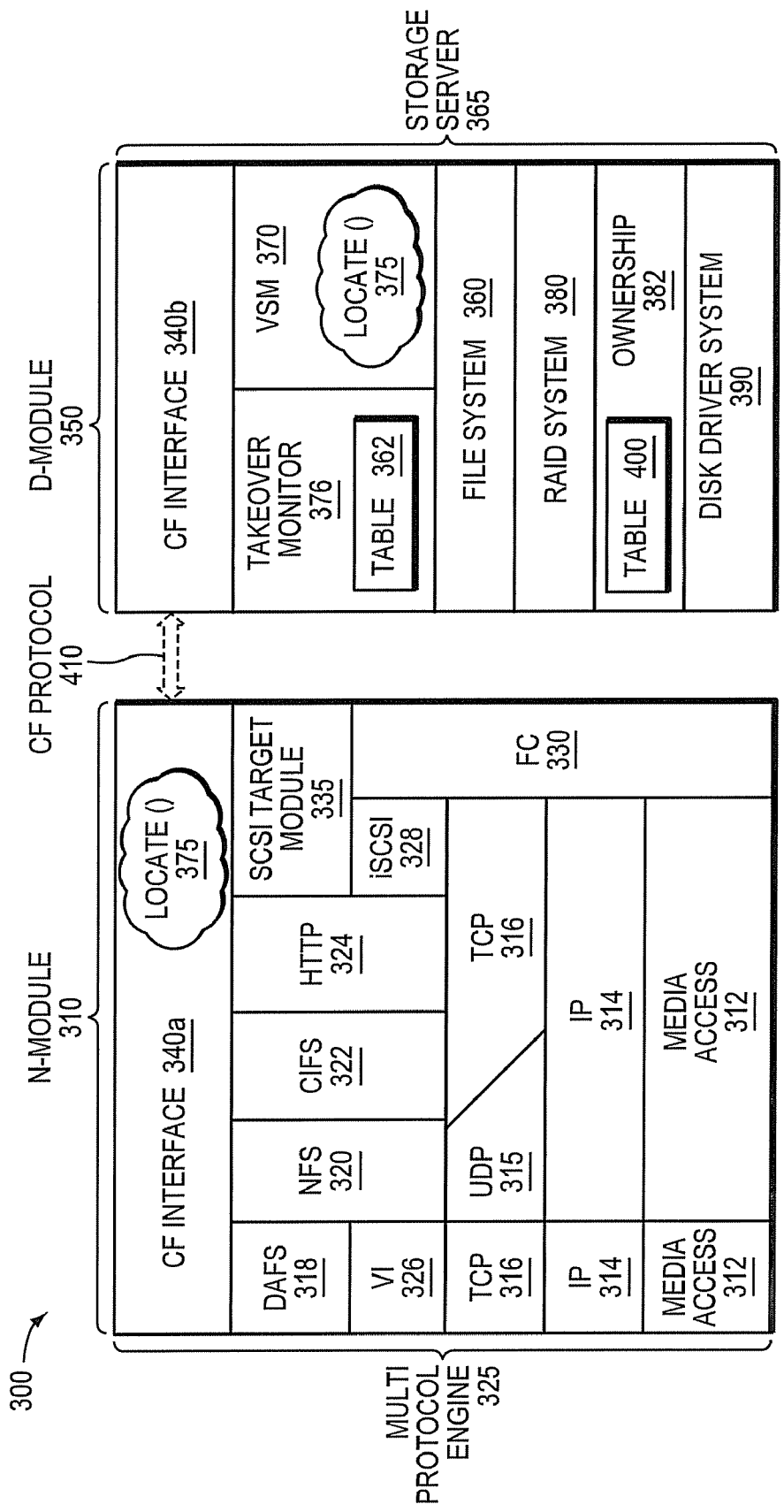
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. As described further herein, the software layers of the storage server are illustratively embodied as a D-module 350. The storage server 365 illustratively comprises a takeover monitor module 376 that maintains a data structure such as the takeover monitor resource table 362. It should be understood that the takeover monitor resource table 362 is not the only possible embodiment of the data structure, but it is described herein for illustrative purposes. The takeover monitor resource table 362 is configured to maintain information regarding takeover procedures, as described further herein. The file system module 360 interacts in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol. However, it should be understood that processes other than the RAID system 380 may in other embodiments perform such tasks while remaining within the scope of the present invention.

The VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

A disk ownership module 382 manages ownership of the disks with respect to their related aggregates and volumes using, for example, one or more data structures such as tables, including, for example, the disk ownership table 400. In particular, the ownership module 382 cooperates with the disk driver system 390 to identify the appropriate D-module for processing data access requests for particular volumes on the disk array 120. To that end, the ownership module consults disk ownership table 400, which contains disk ownership information that is illustratively generated at boot-up time, and that is updated by various components of the storage operating system to reflect changes in ownership of disks. Further details regarding the data structure implemented as ownership table 400 are provided in the above-incorporated U.S. patent application Ser. No. 11/606,538.

Notably, the disk ownership module 382 includes program instructions for writing proper ownership information at a proper location on each disk, which is referred to herein as the ownership location. The disk ownership module 382 also includes program instructions for asserting and eliminating SCSI reservation tags.

Figure 4:
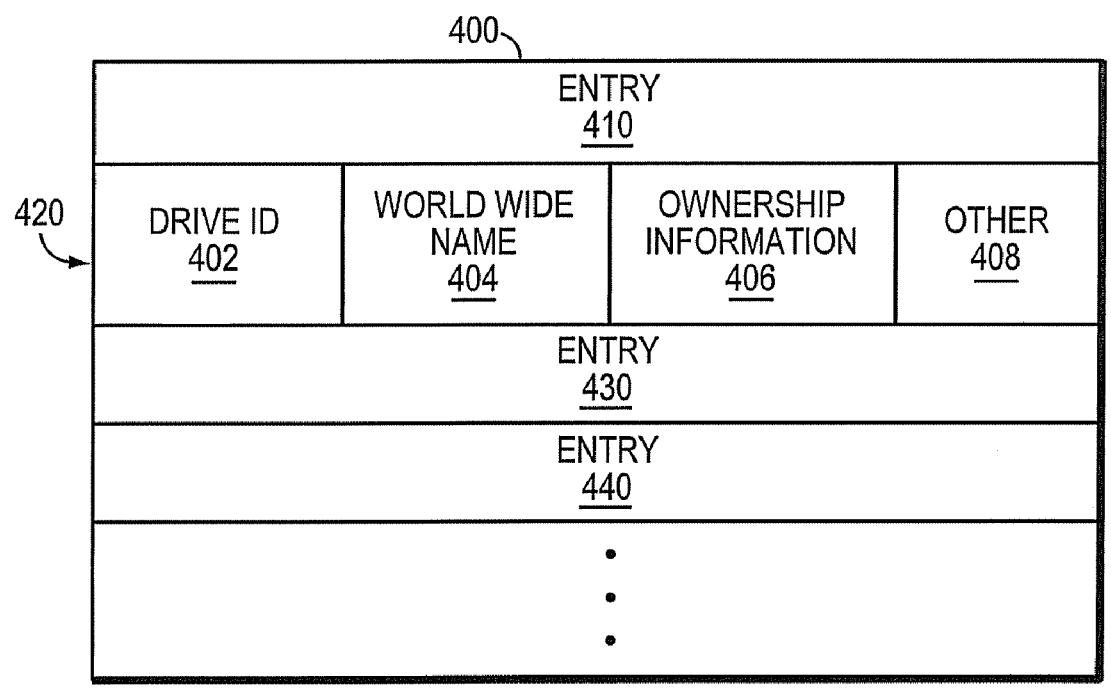
FIG. 4 is an illustrative example of the disk ownership table maintained by the ownership module of the storage operating system.

FIG. 4 is an illustrative example of the data structure implemented as disk ownership table 400, which is maintained by the ownership module 382 of the storage operating system 300. The table comprises a plurality of entries 410, 420, 430 and 440, one for each disk accessible by the appropriate D-module. The individual fields are depicted for an illustrative entry 420, including a drive identification field 402, a world wide name field 404, ownership information field 406 and a field for other information 408. The world wide name is a 64-bit identification number which is unique for every item attached to a fibre channel network. World wide names are described in *ANSI X3.230-1995, Fibre Channel Physical and Signaling Interface (FC-PH)* and Bob Snively, *New Identifier Formats Based on IEEE Registration X3T11/96-467*, revision 2, which are hereby incorporated by reference. The world wide name is generally loaded into disk drives during manufacturing. For file servers (such as D-module 350), the world wide name is normally generated by adding additional data bits to a file server serial number identified within the NVRAM. However, it is expressly contemplated that other means for generating a world wide name (or other appropriate standardized unique naming scheme) for file servers (and D-modules) are possible, including, but not limited to adding the manufacturer's name to a processor identification, etc.

Initially, the disk ownership table 400 is generated upon boot up of the system. More specifically, I/O services of the disk driver system 390 query all devices (e.g., disks 130) attached to the system. This query requests information as to the nature of the attached disks. Upon completion of the query, the ownership module 382 instructs the disk driver system 390 to read the ownership information from each disk. In response, the disk driver system reads the ownership information for each disk 132a from each on-disk ownership location 134a (FIG. 1), and then the ownership module 382 creates the entries in the disk ownership table 400 with this information.

Subsequently, the ownership module 382 accesses the disk ownership table 400 to extract the identification of all disks that are owned by the appropriate D-module. The ownership module then verifies the SCSI reservations on each disk owned by that D-module by reading the ownership information stored in the ownership location on each disk. If the SCSI reservations and on-disk information do not match, the ownership module changes the SCSI reservation to match the on-disk ownership information. Once the SCSI reservations and on-disk ownership information match for all disks identified as owned by the D-module, the ownership module 382 then passes the information to the file system and the RAID module, which configure the individual disks into the appropriate RAID groups and volumes for the D-module 350.

Referring again to FIG. 3, a takeover monitor process 376 operates in conjunction with a cluster fabric (CF) interface module 340b to monitor the heartbeats between the node and the one or more other nodes in the cluster. If the absence of a heartbeat is detected, the takeover monitor process 376 initiates the takeover procedure. In addition, the takeover monitor is also responsive to a storage takeover command by e.g., an administrator. In response to lack of heartbeat or issuance of a storage takeover command, a takeover procedure is triggered at the takeover monitor process 376. When a takeover is initiated by the takeover monitor process 376, it first consults takeover monitor resource table 362, which sets forth the routines to be followed in order to effect a takeover. These routines are summarized illustratively in the flowchart of FIGS. 12A and 12B. The takeover monitor process 376 thereafter notifies other processes, such as the file system 360, the RAID system 380, the ownership module 382 and the disk driver system 390, instructing each to perform respective routines/threads that are necessary steps, which steps are illustratively illustrated herein in the flowchart of FIGS. 12A and 12B, to implement the takeover procedures, in the manner described herein.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 900 (see FIG. 9), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an mode file. A file handle, i.e., an identifier that includes an mode number, is used to retrieve an mode from disk.

Broadly stated, all modes of the write-anywhere file system are organized into the mode file. A file system (fs) info block specifies the layout of information in the file system and includes an mode of a file that includes all other modes of the file system. Each logical volume (file system) has an fsinfo block that is preferably stored at a fixed location within, e.g., a RAID group. The mode of the mode file may directly reference (point to) data blocks of the mode file or may reference indirect blocks of the mode file that, in turn, reference data blocks of the mode file. Within each data block of the mode file are embedded modes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the mode file using the mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write-anywhere file system, the teachings of the present invention may be utilized with any suitable file system, including a write-in-place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each blade includes a CF interface module 340a,b adapted to implement intra-cluster communication among the N- and D-modules, including D-module-to-D-module communication for data container striping operations.

The protocol layers, e.g., the NFS/CIFS layers and the iSCSI/FC layers, of the N-module 310 function as protocol servers that translate file-based and block-based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. As noted, the cluster switching fabric 150 is also used as a second medium over which heartbeats between the nodes are transmitted and received. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

FIG. 5 is a schematic block diagram illustrating the format of a CF message 500 in accordance with an embodiment of the present invention. The CF message 500 is illustratively used for RPC communication over the switching fabric 150 between remote modules of the cluster 100; however, it should be understood that the term "CF message" may be used generally to refer to LPC and RPC communication between modules of the cluster. The CF message 500 includes a media access layer 502, an IP layer 504, a UDP layer 506, a reliable connection (RC) layer 508 and a CF protocol layer 510. As noted, the CF protocol is a generic file system protocol that conveys file system commands related to operations contained within client requests to access data containers stored on the cluster 100; the CF protocol layer 510 is that portion of message 500 that carries the file system commands. For example, the storage system command issued by the administrator in accordance with the invention may be sent over the CF fabric to another storage system node in the cluster, if necessary. Illustratively, the CF protocol is datagram based and, as such, involves transmission of messages or "envelopes" in a reliable manner from a source (e.g., an N-module 310) to a destination (e.g., a D-module 350). The RC layer 508 implements a reliable transport protocol that is adapted to process such envelopes in accordance with a connectionless protocol, such as UDP 506.

A data container, e.g., a file, is accessed in the file system using a data container handle. FIG. 6 is a schematic block diagram illustrating the format of a data container handle 600 including a SVS ID field 602, an mode number field 604, a unique-ifier field 606 a striped flag field 608 and a striping epoch number field 610. The SVS ID field 602 contains a global identifier (within the cluster 100) of the SVS within which the data container resides. The mode number field 604 contains an mode number of an mode (within an mode file) pertaining to the data container. The unique-ifier field 606 contains a monotonically increasing number that uniquely identifies the data container handle 600. The unique-ifier is particularly useful in the case where an mode number has been deleted, reused and reassigned to a new data container. The unique-ifier distinguishes that reused mode number in a particular data container from a potentially previous use of those fields. The striped flag field 608 is illustratively a Boolean value that identifies whether the data container is striped or not. The striping epoch number field 610 indicates the appropriate striping technique for use with this data container for embodiments where the SVS utilizes differing striping techniques for different data containers.

E. File System Organization

Figure 7:
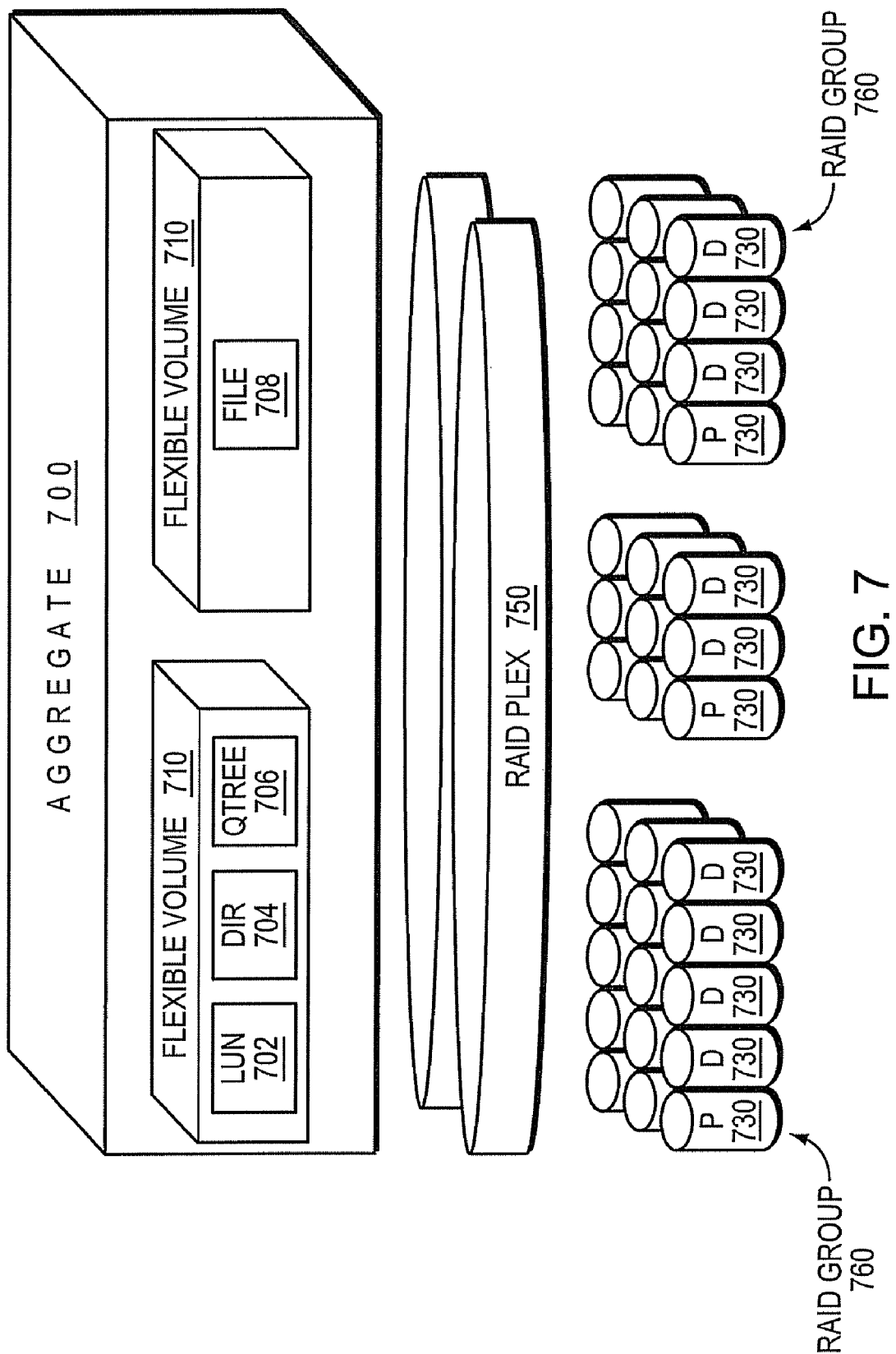
FIG. 7 is a schematic block diagram of an exemplary aggregate in accordance with an illustrative embodiment of the present invention.

FIG. 7 is a schematic block diagram of an embodiment of an aggregate 700 (which may also be a data container, such as a physical volume) that may be advantageously used with the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and zero or more (P) parity disks.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers, each of which corresponds to an offset within the file. These offset values are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of the subdirectory being a file system identifier (fsid) of the flexible volume. Each fsid subdirectory (flexible volume) contains at least two files, a file system file and a storage label file. The storage label file is illustratively a 4 kB file that contains metadata similar to that stored in a conventional RAID label. In other words, the storage label file is the analog of a RAID label and, as such, contains information about the state of the flexible volume such as, e.g., the name of the flexible volume, a universal unique identifier (uuid) and fsid of the flexible volume, whether it is online, being created or being destroyed, etc.

Figure 8:
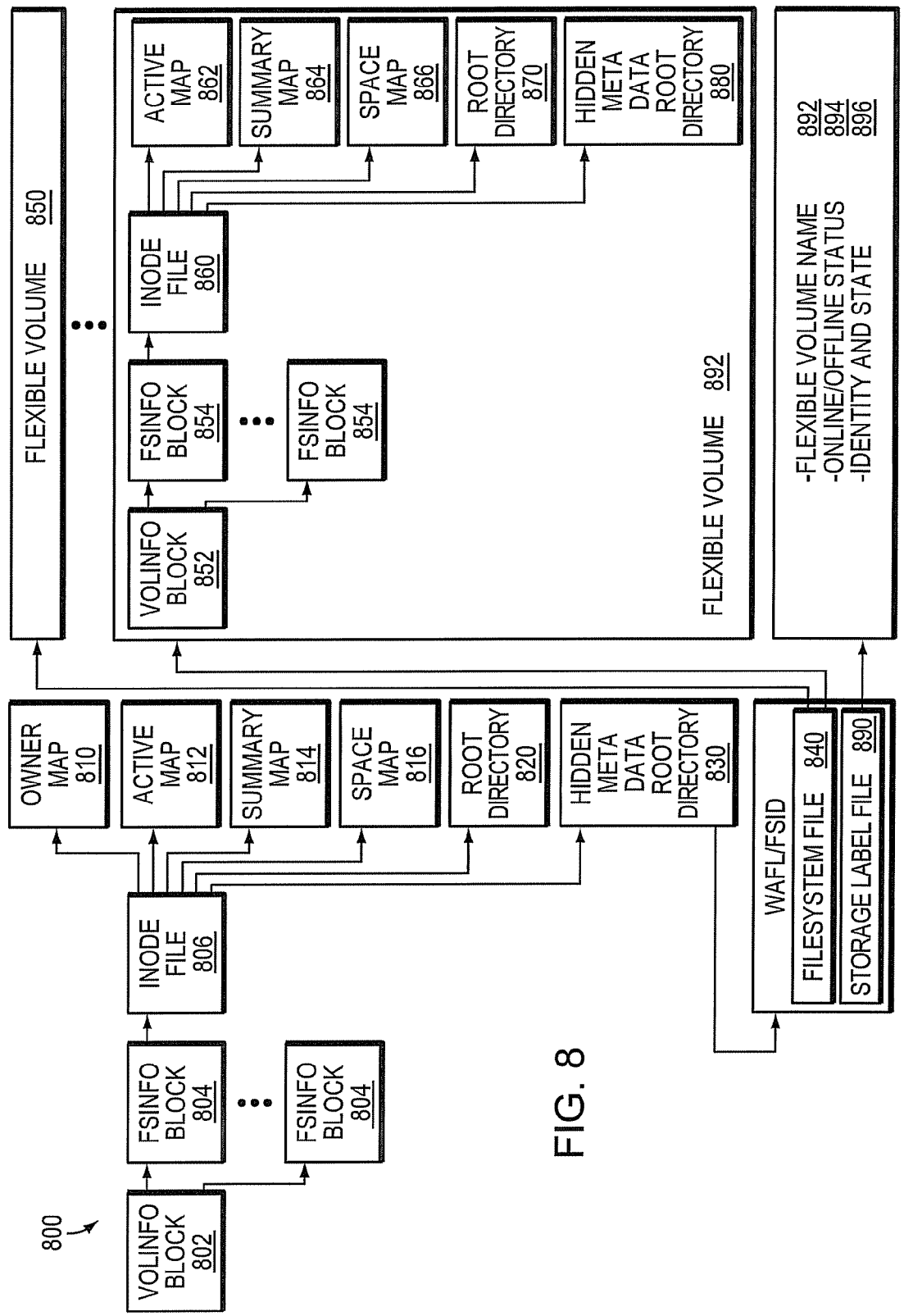
FIG. 8 is a schematic block diagram of an exemplary on-disk layout of the aggregate in accordance with an embodiment of the present invention.

FIG. 8 is a schematic block diagram of an exemplary on-disk layout of an aggregate 800 in accordance with an embodiment of the present invention. The storage operating system 300, e.g., the RAID system 380, assembles a physical volume of pvbns to create the aggregate 800, with pvbns 1 and 2 comprising a "physical" volinfo block 802 for is the aggregate. The volinfo block 802 contains block pointers to fsinfo blocks 804, each of which may represent a snapshot of the aggregate. The fsinfo block 804 contains the fsid which is the file system identifier that indicates the snapshot number. As discussed further herein, the software program of the present invention searches for duplicate fsids among the fsid info blocks 804 in the newly formed aggregate 800, and assigns new numbers to each fsid that is a duplication of an fsid already used in the surviving node's original aggregate.

Each fsinfo block 804 includes a block pointer to an mode file 806 that contains modes of a plurality of files, including an owner map 810, an active map 812, a summary map 814 and a space map 816, as well as other special meta-data files. The mode file 806 further includes a root directory 820 and a "hidden" meta-data root directory 830, the latter of which includes a namespace having files related to a flexible volume in which users cannot "see" the files. The hidden meta-data root directory includes the WAFL/fsid/directory structure that contains filesystem file 840 and storage label file 890. Note that root directory 820 in the aggregate is empty; all files related to the aggregate are organized within the hidden meta-data root directory 830.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved mode numbers. Each flexible volume 850 also has special reserved mode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same mode file structure/content as the aggregate, with the exception that there is no owner map and no WAFL/fsid/filesystem file, storage label file directory structure in a hidden meta-data root directory 880. To that end, each flexible volume 850 has a volinfo block 852 that points to one or more fsinfo blocks 854, each of which may represent a snapshot, along with the active file system of the flexible volume. Each fsinfo block, in turn, points to an mode file 860 that, as noted, has the same mode structure/content as the aggregate with the exceptions noted above. Each flexible volume 850 has its own mode file 860 and distinct mode space with corresponding mode numbers, as well as its own root (fsid) directory 870 and subdirectories of files that can be exported separately from other flexible volumes.

The storage label file 890 contained within the hidden meta-data root directory 830 of the aggregate is a small file that functions as an analog to a conventional RAID label. A RAID label includes physical information about the storage system, such as the volume name; that information is loaded into the storage label file 890. Illustratively, the storage label file 890 includes the name 892 of the associated flexible volume 850, the online/offline status 894 of the flexible volume, and other identity and state information 896 of the associated flexible volume (whether it is in the process of being created or destroyed).

F. VLDB

Figure 9:
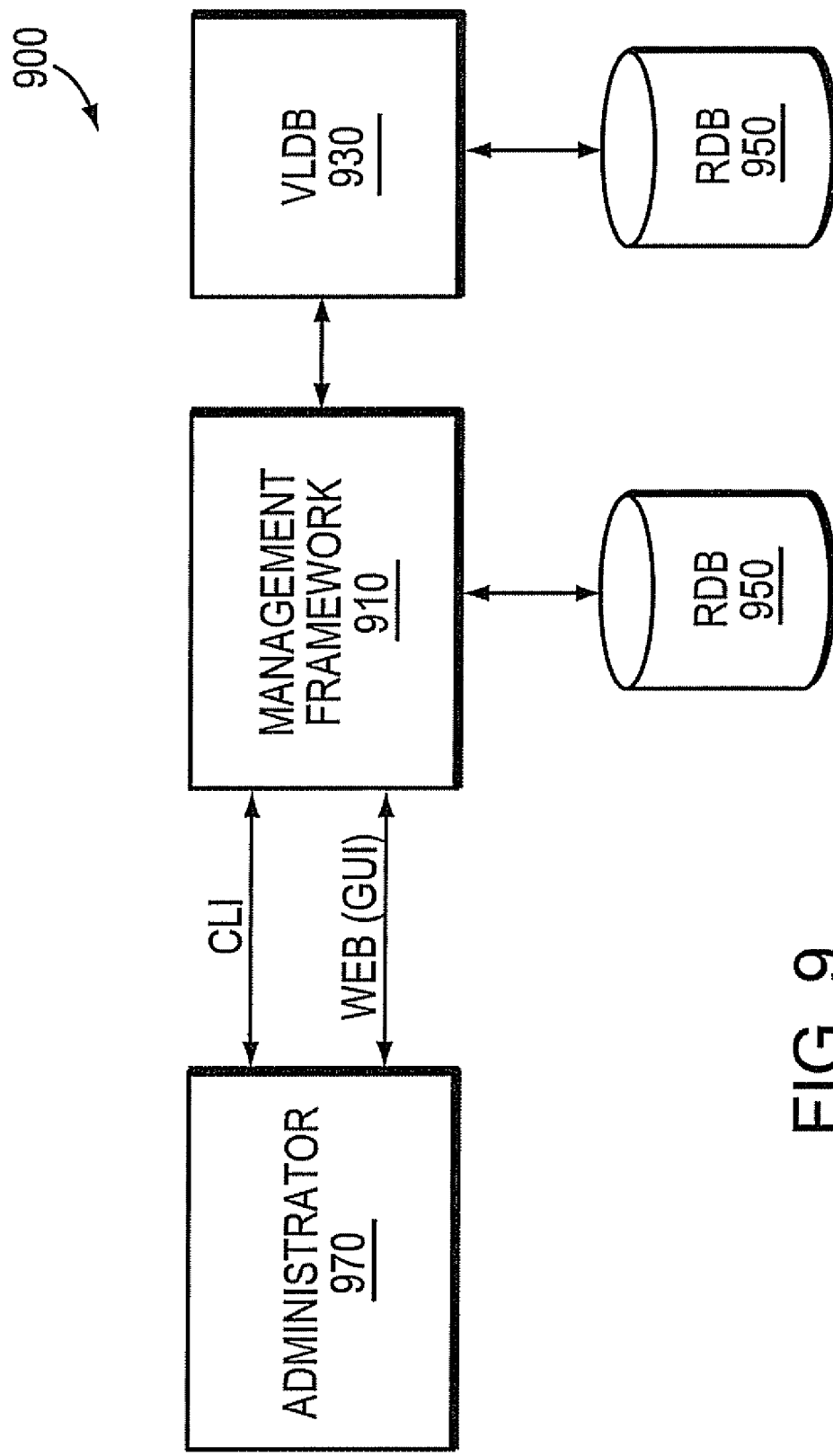
FIG. 9 is a schematic block diagram illustrating a collection of management processes in accordance with an illustrative embodiment of the present invention.

FIG. 9 is a schematic block diagram illustrating a collection of management processes that execute as user mode applications 900 on the storage operating system 300 to provide management of configuration information (i.e. management data) for the nodes of the cluster. To that end, the management processes include a management framework process 910 and a volume location database (VLDB) process 930, each utilizing a data replication service (RDB 950) linked as a library. The management framework 910 provides a user to an administrator 970 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 930 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 602 of a data container handle 600 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 710") and aggregates 700 within the cluster. Examples of such VLDB entries include a VLDB volume entry 1000 (FIG. 10) and a VLDB aggregate entry 1100 (FIG. 11).

FIG. 10 is a schematic block diagram of an exemplary VLDB volume entry 1000. The entry 1000 includes a volume ID field 1005, an aggregate ID field 1010 and, in alternate embodiments, additional fields 1015. The volume ID field 1005 contains an ID that identifies a volume 710 used in a volume location process. The aggregate ID field 1010 identifies the aggregate 700 containing the volume identified by the volume ID field 1005. Likewise, FIG. 11 is a schematic block diagram of an exemplary VLDB aggregate entry 1100. The entry 1100 includes an aggregate ID field 1105, a D-module ID field 1110 and, in alternate embodiments, additional fields 1115. The aggregate ID field 1105 contains an ID of a particular aggregate 700 in the cluster 100. The D-module ID field 1110 contains an ID of the D-module hosting the particular aggregate identified by the aggregate ID field 1105.

The VLDB illustratively implements a RPC interface, e.g., a Sun RPC interface, which allows the N-module 310 to query the VLDB 930. When encountering contents of a data container handle 600 that are not stored in its configuration table, the N-module sends an RPC to the VLDB process. In response, the VLDB 930 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and RDB library user mode applications.

To that end, the management processes have interfaces to (are closely coupled to) RDB 950. The RDB comprises a library that provides a persistent object store (storing of objects) for the management data processed by the management processes. Notably, the RDB 950 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Takeover

As discussed, a takeover process is performed upon absence of a heartbeat, or when the storage takeover command is issued. In either case, the takeover monitor 376 receives notice of the triggered failover and consults the takeover monitor resource table 362 to obtain the procedures which are to be followed by one or more processes in the storage server 365 in order to perform a takeover of the failed node's disks by the surviving storage system node. For example, the takeover monitor process 376 notifies other processes, such as the file system 360, the RAID system 380, the ownership module 382 and the disk driver system 390, instructing each to perform respective routines/threads that are necessary steps to implement the takeover procedures, in the manner described herein.

One of the procedures, illustratively, is to confirm that there is, in fact, a failure of the node (and not simply a failure of the cluster interconnect coupling or the cluster switching fabric). To that end, the surviving node accesses a master mailbox disk of the failed node (i.e., D-module). The mailbox is created upon boot up of the takeover process software. If the failed D-module has not written to the mailbox in a timely fashion, the failure is confirmed and the takeover monitor instructs the surviving node to begin takeover of the disks.

Next, the takeover monitor process 376 instructs the disk driver system 390 of the surviving storage system node's D-module to assert new SCSI-3 reservations on each is disk formerly owned by the failed D-module. Notably, the illustrative embodiment is described with reference to a SCSI environment, as will be understood by those skilled in the art, in which SCSI level 3 persistent reservations (as described in SCSI primary commands-3 by Community 10 of the National Committee for Information Technology Standards, which is incorporated fully herein by reference) would have been previously placed on the disks by the now failed D-module. Using SCSI-3 reservations, a D-module can write to a disk if it holds the SCSI-3 reservations for that disk, i.e., non-owning D-modules are prevented from writing to disks because they do not have the SCSI-3 reservation. However, the non-owning file service can read ownership information from a predetermined location on the disk. In accordance with the invention, the disk driver process in the D-module has been programmed with instructions allowing it to pre-empt SCSI reservations on disks in the cluster. Thus, upon a failure, the takeover monitor instructs the surviving D-module to first pre-empt the existing SCSI reservations on the disks previously serviced by the failed node. Once these SCSI reservations have been pre-empted, the surviving node asserts its own SCSI reservations on the disks of the failed node, in the manner defined in the above-cited SCSI-3 ANSI standard specification.

In an alternative aspect of the invention, two or more nodes can simultaneously access and serve data from a common set of disks, but from separate regions (i.e., blocks) on those disks. More specifically, as will be understood by those skilled in the art, individual disks may be logically divided up into regions of contiguous blocks, and ownership information for each region is maintained in a separate ownership location on the disk for each region. This allows two or more nodes to simultaneously access and to serve data access requests from a common set of disks, but from separate regions of those disks. However, in such a configuration, SCSI reservations would not be applicable because such SCSI reservations apply to an entire disk. Consequently, alternative software and/or hardware mechanisms are applied in accordance with the invention to permit or to restrict access to portions of disks.

For example, access can be controlled by appropriately changing the ownership information for each region of the disk and/or by using a fencing technique whereby access permission rights are granted or denied for specific regions of the disks. Such fencing techniques may be for example: A) a distributed protocol running across the D-modules that guarantees that only one node has access to a file system region of the disk at any one time (a region being defined as one or more disk blocks, up to the entire disk, not necessarily contiguous) in a system in which each D-module is programmed to honor its access constraints; and B) hardware and/or firmware logic in the shared storage stack underneath the D-modules, e.g., the disk shelf, provides the fencing. A distributed protocol is typically still required; however, enforcement is stricter in that a D-module in this embodiment cannot write outside its ownership areas. These and other suitable techniques may also be employed when the invention is implemented in a non-SCSI environment for the assertion of ownership on the disks by the takeover node.

As noted herein, in an illustrative embodiment of the invention, ownership information is also stored in a particular location of the disk, which acts as the definitive ownership location on the disk. In an illustrative embodiment of the invention, if the SCSI-3 reservations do not match the on-disk ownership location data, the on-disk ownership information is used. In the case of takeover, the takeover monitor 376 cooperates with the disk driver system 390 to assert new SCSI-3 reservations on each disk formerly owned by the failed D-module and which now are under the control of the surviving D-module.

After asserting its SCSI-3 reservations, the surviving node calls the surviving D-module's RAID system 380 to assimilate all newly owned disks into one or more aggregates 700. The proper RAID calculations and configurations are then performed. Thereafter, to finalize the RAID assimilation, the RAID system initiates replay of the RAID section of the NVRAM to flush any final parity computations therefrom.

Specifically, the RAID system 380 adjusts the "current owner" status in the ownership location of each newly assimilated disk to indicate that the surviving node is now the "current owner" of that disk. Thereafter, each newly assimilated aggregate appears to be locally owned by the surviving D-module. On the surviving node, the NVRAM log containing NVRAM entries of the failed node is replayed so that any data in the newly assimilated aggregates are fully up to date.

As will be understood by those skilled in the art, a data write request issued by a client is not acknowledged as having been received successfully until the data has been written and stored in a non-volatile memory. Illustratively, in the present cluster environment, a client-issued data write request is first stored in the NVRAM 227 of the node 200 having the D-module that currently owns the relevant disk. The write request data is then written to a backup NVRAM of another (partner) D-module in the cluster prior to the write operation being acknowledged to the client. Later, at a consistency point, the newly obtained data is written from the NVRAM of the current owner D-module to the actual disk. This protects the data in such a cluster environment, so that if a failure occurs prior to the data being written to disk, that data has been stored in the backup NVRAM of the partner D-module in the cluster.

Accordingly, when a takeover occurs, the NVRAM data of the failed node is stored within the NVRAM of the surviving node and can be played back (written to the disks) at the appropriate time to bring the data into the most current state possible. Illustratively, the NVRAM has a RAID section which stores RAID calculation updates, and a file system section which stores file system data. Each section of the NVRAM is replayed at the appropriate time as discussed in further detail with respect to the flow chart of FIGS. 12A and 12B.

In accordance with the present invention, the data of the failed node is to be assimilated into a new aggregate image. However, as noted herein, the data had been originally owned by two different D-modules, and thus some of the file system IDs ("fsids") may be duplicated. In accordance with the invention, in order to avoid any inconsistencies and errors, these duplicate fsids are corrected so that each fsid for each volume in the newly assimilated aggregate is unique. This, in turn, ensures that the newly assimilated aggregate does not contain any identical (duplicate) fsids.

The volumes of the newly assimilated aggregate are then brought online and the VLDB is updated. As noted, the VLDB keeps track of the location of the volumes 710 and aggregates 700 within the cluster as well as their host D-module. Thus, the VLDB 930 changes the D-module ID 1110 to reflect the new D-module hosting the aggregate. Thereafter, the N-module is allowed to send requests to the updated surviving D-module. The D-module processes data access requests for its locally-owned disks and the newly acquired disks until further notice. The surviving D-module then continues to process data access requests while the failed D-module remains in a "waiting for send home" state.

Figure 12A:
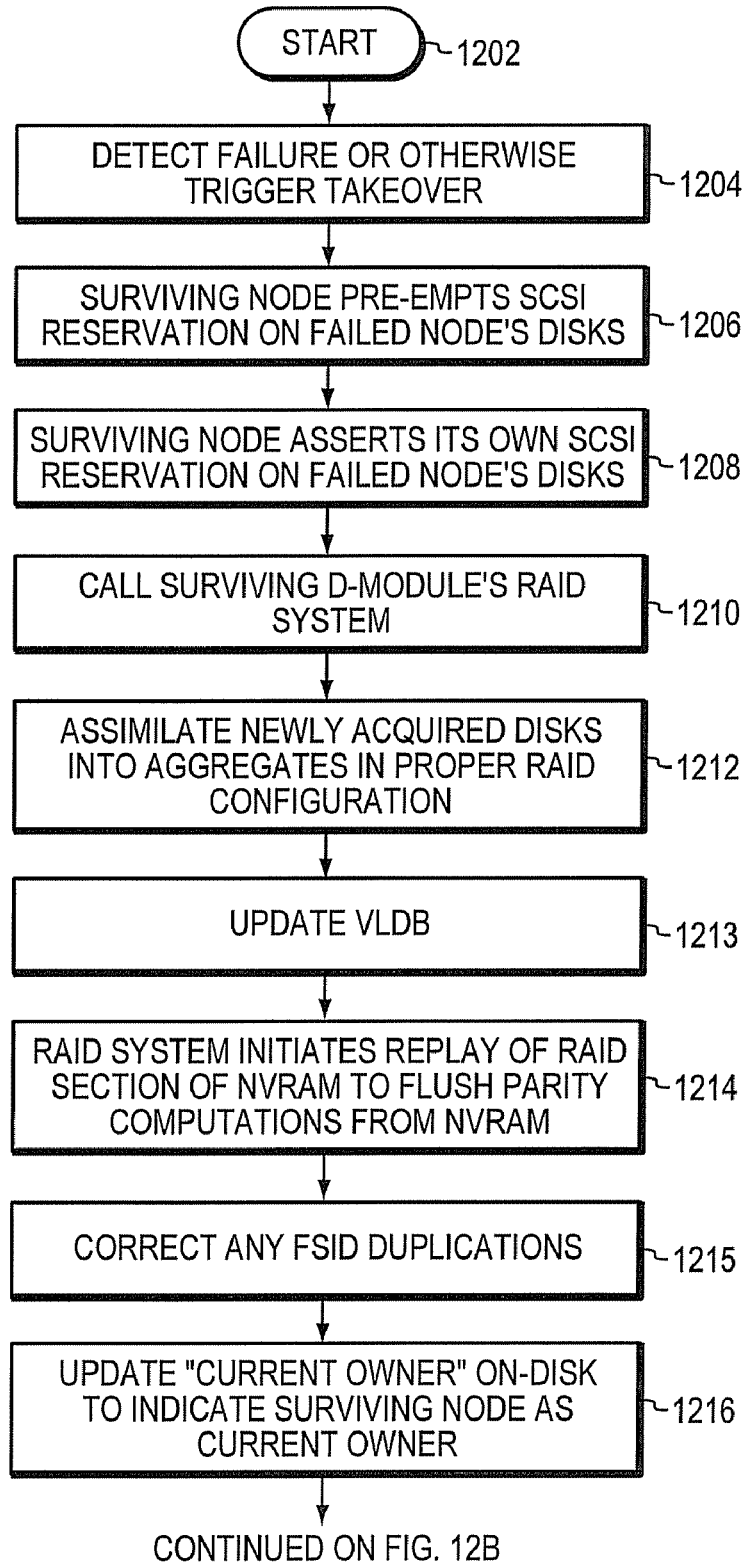
FIGS. 12A and 12B together form a flow chart of a procedure for takeover operation in accordance with an illustrative embodiment of the present invention.
Figure 12B:
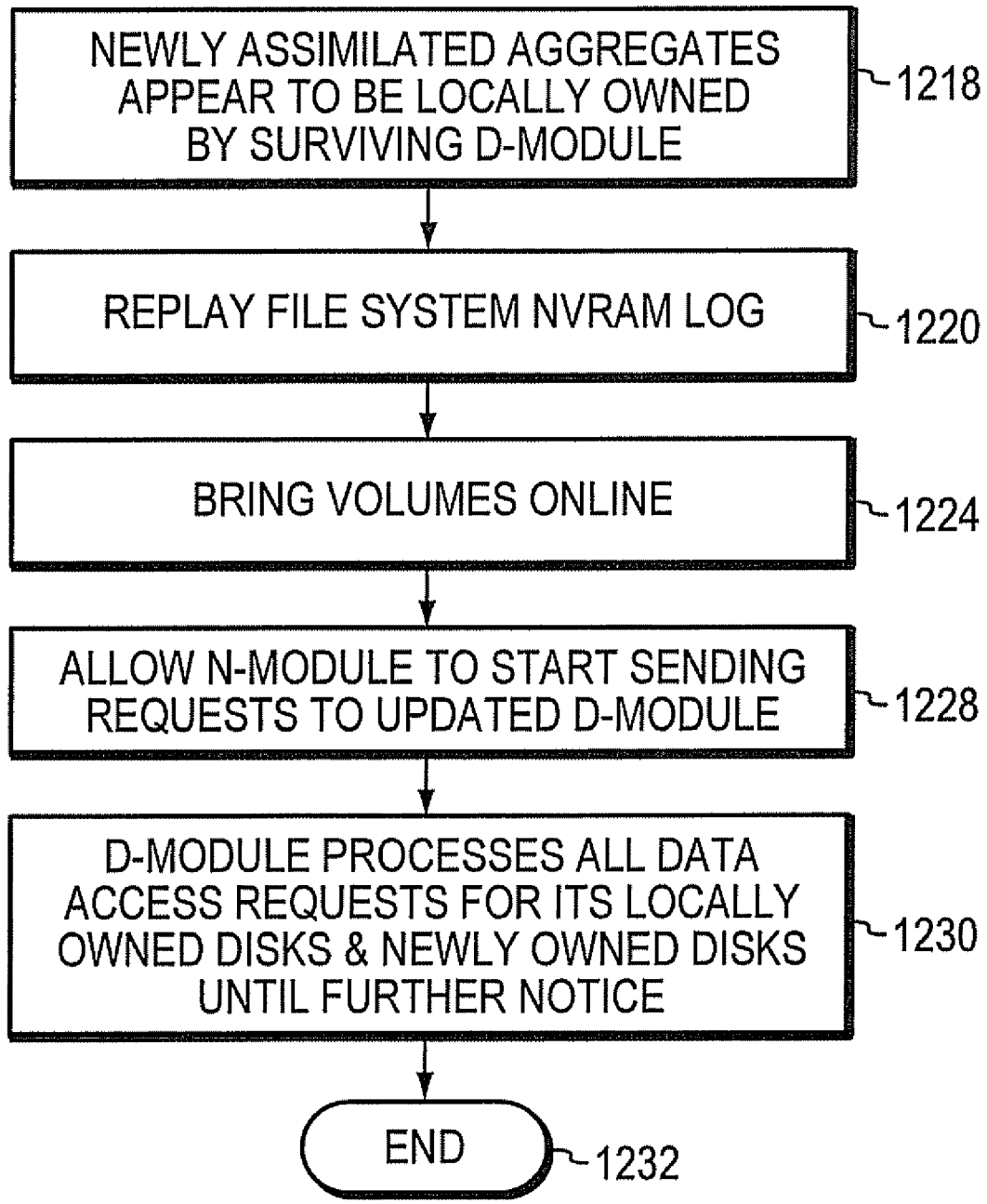

The method of takeover in accordance with the present invention is described in further detail in the flowcharts of FIGS. 12A and 12B. As set forth in FIG. 12A, the procedure starts at step 1202 and continues to step 1204 where a failure is detected or a storage takeover command is received at the takeover monitor process 376. At step 1206, the surviving storage system node pre-empts the SCSI reservations, as described herein on the disks previously associated with the failed storage system node. In step 1208, the surviving storage system node asserts its own SCSI reservations on the failed node's disks. As noted herein, another technique, such as a fencing technique, can be employed when only a portion of the disk is involved, or when the implementation is not using the SCSI protocol to access the disks, or in such other circumstances as desired in a particular application of the invention.

In the illustrative implementation of the invention, the surviving storage system node then calls the RAID system of the surviving D-module in step 1210. In step 1212, each disk previously associated with the failed storage system node is assimilated into a new data container. Illustratively, the RAID system 380 performs block-based assimilation of the newly acquired disks into aggregates, and the proper RAID calculations and configurations are performed. Notably, other embodiments of the invention may not include a RAID system, in which case other suitable processes will assimilate the disks into aggregates. In step 1213, the VLDB is updated. The procedure continues to step 1214 where the RAID system initiates replay of the RAID section of the NVRAM to flush any final parity computations from the RAID section of the NVRAM. It should be appreciated, however, that if the storage network does not use RAID, the blocks of data on the disks can be assimilated by another suitable process while remaining within the scope of the present invention.

Once the RAID assimilation has been performed, then, as illustrated in step 1215, in order to avoid any inconsistencies and errors, any fsid duplications are corrected if the new aggregate refers to an identical fsid as the node's original aggregate. It is noted that aggregate IDs are unique within a cluster, so the aggregate ID numbers will not need to be checked because there should not be such duplications. Then, the procedure continues to step 1216 where the RAID system adjusts the "current owner" status in the ownership location on the disks to indicate that the surviving node is now the current owner of the newly assimilated disks. In step 1218, the newly assimilated aggregates now appear to be locally owned by the surviving D-module. The file system 360 on the surviving node then receives notice that the aggregates have been successfully assimilated, as illustrated in step 1218. On the surviving node, the file system NVRAM log containing the file system NVRAM entries of the failed node is replayed so that data in the newly assimilated aggregates is brought fully up to date (step 1220). As noted, for purposes of clarity of illustration, the invention is described with reference to a single newly assimilated aggregate. It should be under stood, however, that one or more newly assimilated aggregates can be served by one or more surviving D-modules, while remaining within the scope of the present invention.

The volumes are brought online as shown in step 1224. The procedure then continues to step 1228, in which the N-module is allowed to send requests to the updated surviving D-module. As shown in step 1230, the D-module processes data access requests for its locally owned disks and for the newly acquired disks until further notice. The surviving D-module then continues to process data access requests while the failed D-module remains in the waiting for send home state. The procedure ends at step 1232.

The procedure of FIGS. 12A and 12B is illustrative of a configuration in which a single D-module takes over all of the disks of a failed D-module. It should be understood, however, that the invention also encompasses other configurations in which multiple D-modules are connected together in the cluster. For example, a system may be configured in such a manner that D-modules "A" "B" and "C" are interconnected such that write data for half of module A's aggregate are routed to module B and the other half are routed to module C for a takeover. More specifically, upon a failure of module A, the takeover monitor process 376 running in module B is programmed such that module B performs steps 1206 through 1230 (FIGS. 12A/12B) on the set of disks that it has been assigned to take over from module A. Similarly, module C follows the procedure for the remaining disks of failed module A. In this case, the newly assimilated aggregate is spread across two D-modules. Alternatively, multiple newly assimilated aggregates can be produced in accordance with the invention. This allows for load balancing of I/O traffic.

It should be understood that once the takeover is performed, all aggregate/volumes operate as if they are local to the surviving D-module. From this point onward, there is no partner to local association as in prior systems. In addition, management processes ensure that there is a unique aggregate name throughout the cluster. It should be understood that the present invention provides a simple process for takeover of disks in a storage takeover cluster. The technique has the feature of eliminating partner mode such that it presents a newly assimilated aggregate to its upper software layers and to the N-module. In other words, the images of the disks exposed by the D-module are collapsed into a newly assimilated aggregate during takeover as opposed to requiring a separate partner and local image to be maintained.

Advantageously, the present invention reduces code complexity and operational resources. Thus, the present invention provides a system in which in any set of disks that represents an aggregate can be taken over by any D-module so that the disks are properly recognized as being served by the surviving D-module. It is further noted that the procedure described herein is accomplished without involvement of the processes of the N-module.

The foregoing description has been directed to particular embodiments of the invention. It will be apparent, however, that other variations and modifications may be made to the described embodiments, with the attainment of some or all of their advantages. Specifically, it should be noted that the principles of the invention may be implemented in a non-distributed file system. Furthermore, while this description has been written in terms of D and N-modules, the teachings of the present invention are equally suitable to systems where the functionality of the N- and D-modules is implemented in a single system. Alternatively, the functions of the N- and D-modules may be distributed among a number of separate systems, wherein each system performs one or more functions. Additionally, the features of the present invention have been described with respect to a cluster which contains two nodes, however, it is equally applicable to clusters including a plurality of nodes, which allow for n-way fail over. Additionally, the procedures, processes and/or modules described herein may be implemented in hardware, software, embodied as a computer readable medium having program instructions, firmware, or a combination thereof. Therefore, it is the object of the appended claims to cover all such variations and modifications as come within the true spirit and scope of the invention.

What is claimed is:

1. A method for performing a takeover procedure, comprising:
    coupling a plurality of storage system nodes in a cluster;
    triggering a takeover process for a first storage system node of the plurality of storage system nodes in the cluster to takeover a portion of a writable storage device serviced by a second storage system node of the plurality of storage system nodes in the cluster;
    in response to triggering the takeover process, assimilating the portion of the writable storage device into one or more data containers serviced by the first storage system node;
    checking whether the assimilated portion comprises a first volume identification (ID) that matches a second volume ID of the first storage system node; and
    in response to a match, assigning a new volume ID to the first volume ID or assigning the new volume ID to the second volume ID.

2. The method of claim 1 wherein the portion of the writable storage device is assimilated by a RAID system process of the first storage system node.

3. The method of claim 1 further comprising asserting, by the first storage system node, ownership of the portion of the writable storage device serviced by the second storage system node.

4. The method of claim 3 wherein asserting ownership comprises using a fencing technique.

5. The method of claim 1 further comprising:
    assigning a status in an ownership locations associated with the portion of the writable storage device; and
    identifying the first storage system node as a current owners of the portion of the writable storage device by the assigned status.

6. The method of claim 5 wherein the ownership location is on the writable storage device.

7. The method of claim 1 wherein the first volume ID comprises a file system ID.

8. The method of claim 1 further comprising:
    storing memory data from the second storage system node to a memory of the first storage system node; and
    replaying the stored memory data from the memory of the first storage system node.

9. The method of claim 1 further comprising appearing to the first storage system node that the assimilated portion of the writable storage device is local to the first storage system node.

10. The method of claim 1 further comprising updating a volume location database to reflect the assimilation.

11. The method of claim 1 wherein the first storage system node comprises a network element.

12. The method of claim 1 wherein the first storage system node comprises a D-module and a network element.

13. The method of claim 1 wherein the portion of the writable storage device is assimilated into an aggregate of the first storage system node.

14. The method of claim 1 further comprising:
    pre-empting a second storage system node reservation on the portion of the writable storage device; and
    asserting a first storage system node reservation on the portion of the writable storage device.

15. The method of claim 14 wherein the first storage system node reservation comprises a small computer systems interface (SCSI) reservation.

16. The method of claim 1 wherein the writable storage device comprises electronic random access memory.

17. A computer system for use in a clustered environment, comprising:
    a first storage system node configured to operatively connect with a second storage system node;
    the first storage system node further configured to provide a communication path between the first storage system node and the second storage system node; and
    a processor operatively interconnected with the first storage system node and configured to execute a takeover procedure, the takeover procedure configured to assimilate a portion of a writable storage device serviced by the second storage system node into one or more data containers serviced by the first storage system node, the takeover procedure further configured to check whether the assimilated portion comprises a first volume identification (ID) that matches a second volume ID of the first storage system node, and in response to a match, assign a new volume ID to the first volume ID or assign the new volume ID to the second volume ID.

18. The computer system of claim 17 wherein the first volume ID comprises a file system ID.

19. The computer system of claim 17 wherein the takeover procedure is further configured to instruct an ownership module of the first storage system node to change one or more ownership attributes of the writable storage device from the second storage system node to the first storage system node.

20. The computer system of claim 17 wherein the first storage system node is further configured to assert ownership on the portion of the writable storage device serviced by the second storage system node.

21. The computer system of claim 17 wherein the writable storage device is electronic random access memory.

22. The computer system of claim 17 wherein the one or more data containers comprises an aggregate.

23. A computer-readable storage medium containing executable program instructions executed by a processor, comprising:
   program instructions that trigger a takeover process for a first storage system node of a plurality of storage system nodes in a cluster to takeover a portion of a writable storage device serviced by a second storage system node in the cluster;
   program instructions that, in response to triggering the takeover process, assimilate the portion of the writable storage device into one or more data containers serviced by the first storage system node;
   program instructions that check whether the assimilated portion comprises a first volume identification (ID) that matches a second volume ID of the first storage system node; and
   program instructions that, in response to a match, assign a new volume ID to the first volume ID or that assign the new volume ID to the second volume ID.

24. The computer-readable medium of claim 23, further comprising program instructions that change one or more ownership attributes of the portion of the writable storage device from the second storage system node to the first storage system node.

25. The computer system of claim 17, wherein the takeover procedure is further configured to pre-empt a reservation of the second storage system node on the portion of the writable storage device.

26. The computer-readable medium of claim 25, further comprising program instructions that preempt a second storage system node reservation on the portion of the writable storage device and program instructions that assert a first storage system node reservation on the portion of the writable storage device.

27. The computer system of claim 17 wherein the takeover procedure is further configured to store memory data from the second storage system node to a memory of the first storage system node, and further configured to replay the stored memory data from the memory of the first storage system node.

28. The computer system of claim 17 wherein the assimilation is performed by a RAID system process of the first storage system node.

29. The computer-readable medium of claim 23 wherein the writable storage device is an electronic random access memory.

30. The computer-readable medium of claim 23 wherein the one or more data containers comprises an aggregate.

* * * * *

UNITED STATES PATENT AND TRADEMARK OFFICE
CERTIFICATE OF CORRECTION

| | | |
|---|---|---|
| PATENT NO. | : 7,930,587 B1 | Page 1 of 3 |
| APPLICATION NO. | : 12/548501 | |
| DATED | : April 19, 2011 | |
| INVENTOR(S) | : Susan M. Coatney et al. | |

It is certified that error appears in the above-identified patent and that said Letters Patent is hereby corrected as shown below:

In Col. 11, line 34 should read:
    byte (kB) blocks and using index nodes ("~~modes~~inodes") to identify In Col. 11, line 38 should read:
    metadata files include, among others, an ~~mode~~ inode file. A file In Col. 11, line 39 should read:
    handle, i.e., an identifier that includes an ~~mode~~ inode number, is In Col. 11, line 40 should read:
    used to retrieve an ~~mode~~ inode from disk.

In Col. 11, line 41 should read:
    Broadly stated, all ~~modes~~ inodes of the write-anywhere file system In Col. 11, line 42 should read:
    are organized into the ~~mode~~ inode file. A file system (fs) info block In Col. 11, line 44 should read:
    includes an ~~mode~~ inode of a file that includes all other ~~modes~~ inodes of the In Col. 11, line 47 should read:
    a RAID group. The ~~mode~~ inode of the ~~mode~~ inode file may directly In Col. 11, line 48 should read:
    reference (point to) data blocks of the ~~mode~~ inode file or may In Col. 11, line 49 should read:
    reference indirect blocks of the ~~mode~~ inode file that, in turn, refer- Signed and Sealed this
Seventh Day of February, 2012

David J. Kappos
*Director of the United States Patent and Trademark Office*

CERTIFICATE OF CORRECTION (continued)

U.S. Pat. No. 7,930,587 B1

In Col. 11, line 50 should read:
ence data blocks of the ~~mode~~ inode file. Within each data block of In Col. 11, line 51 should read:
the ~~mode~~ inode file are embedded ~~modes~~inodes, each of which may ref- In Col. 11, line 64 should read:
the ~~mode~~ inode file using the ~~mode~~ inode number to access an appropriate In Col. 14, line 20 should read:
including a SVS ID field 602, an ~~mode~~ inode number field 604, a In Col. 14, line 24 should read:
which the data container resides. The ~~mode~~ inode number field 604

In Col. 14, line 25 should read:
contains an ~~mode~~ inode number of an ~~mode~~ inode (within an ~~mode~~ inode file)

In Col. 14, line 29 should read:
particularly useful in the case where an ~~mode~~ inode number has In Col. 14, line 31 should read:
The unique-ifier distinguishes that reused ~~mode~~ inode number in a In Col. 15, line 44 should read:
Each fsinfo block 804 includes a block pointer to an ~~mode~~inode In Col. 15, line 45 should read:
file 806 that contains ~~modes~~ inodes of a plurality of files, including In Col. 15, line 48 should read:
The ~~mode~~ inode file 806 further includes a root directory 820 and a In Col. 15, line 62 should read:
~~mode~~ inode numbers. Each flexible volume 850 also has special In Col. 15, line 63 should read:
reserved ~~mode~~ inode numbers within its flexible volume space In Col. 16, line 1 should read:
Specifically, each flexible volume 850 has the same ~~mode~~inode In Col. 16, line 9 should read:
turn, points to an ~~mode~~ inode file 860, that, as noted, has the same

CERTIFICATE OF CORRECTION (continued)
U.S. Pat. No. 7,930,587 B1

In Col. 16, line 10 should read:
~~mode~~ inode structure/content as the aggregate with the exceptions In Col. 16, line 11 should read:
noted above. Each flexible volume 850 has its own ~~mode~~ inode file In Col. 16, line 12 should read:
860 and distinct ~~mode~~ inode space with corresponding ~~mode~~ inode num- In Col. 17, line 62 should read:
D-module to assert new SCSI-3 reservations on each ~~is~~ disk